US011261857B2

(12) United States Patent
Gledhill, III et al.

(10) Patent No.: US 11,261,857 B2
(45) Date of Patent: Mar. 1, 2022

(54) SEALING DIAPHRAGM AND METHODS OF MANUFACTURING SAID DIAPHRAGM

(71) Applicant: Blue-White Industries, Ltd., Huntington Beach, CA (US)

(72) Inventors: Robert E. Gledhill, III, Huntington Beach, CA (US); John T. Nguyen, Fountain Valley, CA (US); Steve L. Smith, Costa Mesa, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 0 days.

(21) Appl. No.: 16/448,516

(22) Filed: Jun. 21, 2019

(65) Prior Publication Data

US 2020/0149522 A1 May 14, 2020

Related U.S. Application Data

(63) Continuation of application No. 14/466,211, filed on Aug. 22, 2014, now Pat. No. 10,330,094.

(60) Provisional application No. 61/919,556, filed on Dec. 20, 2013, provisional application No. 61/875,308, filed on Sep. 9, 2013, provisional application No.
(Continued)

(51) Int. Cl.
| | |
|---|---|
| *F04B 43/00* | (2006.01) |
| *F04B 43/02* | (2006.01) |
| *F16J 3/02* | (2006.01) |
| *F04B 45/04* | (2006.01) |
| *B29C 45/14* | (2006.01) |
| *B29K 27/00* | (2006.01) |
| *B29K 705/00* | (2006.01) |
| *B29L 31/00* | (2006.01) |

(52) U.S. Cl.
CPC .......... *F04B 43/0054* (2013.01); *F04B 43/02* (2013.01); *F04B 45/04* (2013.01); *F16J 3/02* (2013.01); *B29C 2045/14327* (2013.01); *B29K 2027/16* (2013.01); *B29K 2705/00* (2013.01); *B29L 2031/755* (2013.01); *F05C 2225/00* (2013.01)

(58) Field of Classification Search
CPC ...... F04B 43/0054; F04B 43/02; F04B 45/04; F16J 3/02; B29C 2045/14327; B29K 2027/16; B29K 2705/00; B29L 2031/755
See application file for complete search history.

(56) References Cited

U.S. PATENT DOCUMENTS

| | | | |
|---|---|---|---|
| 2,018,153 A | 10/1935 | Schulze | |
| 2,675,758 A * | 4/1954 | Hughes | F04B 43/073 417/395 |
| 2,725,211 A | 11/1955 | Boteler | |

(Continued)

FOREIGN PATENT DOCUMENTS

| | | |
|---|---|---|
| CN | 101250276 A | 8/2008 |
| CN | 101509484 B | 8/2011 |

(Continued)

*Primary Examiner* — Peter J Bertheaud
(74) *Attorney, Agent, or Firm* — Knobbe, Martens, Olson & Bear, LLP

(57) ABSTRACT

Described is a method for manufacturing a diaphragm assembly through the use of injection molding. The method can avoid the use of PTFE as a chemically resistant coating. Further, the method can increase overall adherence of a polymer diaphragm to an insert through the use of an interference surface on at least the surface of a head of the insert.

3 Claims, 24 Drawing Sheets

Related U.S. Application Data

61/870,679, filed on Aug. 27, 2013, provisional application No. 61/870,072, filed on Aug. 26, 2013.

(56) References Cited

U.S. PATENT DOCUMENTS

| | | | |
|---|---|---|---|
| 2,748,797 A * | 6/1956 | Heizer | F16K 17/20 |
| | | | 137/510 |
| 2,840,339 A * | 6/1958 | Price | F16K 7/123 |
| | | | 251/331 |
| 2,948,223 A * | 8/1960 | Mashinter | F04B 43/0054 |
| | | | 417/387 |
| 3,032,462 A | 4/1962 | Saporito | |
| 3,666,379 A | 5/1972 | Mitchell | |
| 4,567,814 A | 2/1986 | Eldridge | |
| 4,660,598 A * | 4/1987 | Butterfield | F16K 7/14 |
| | | | 137/510 |
| 4,864,918 A | 9/1989 | Martin | |
| 5,093,067 A | 3/1992 | Gibson | |
| 5,145,336 A | 9/1992 | Becker | |
| 5,242,552 A | 9/1993 | Coin | |
| 5,529,467 A | 6/1996 | Rometsch | |
| 5,634,391 A | 6/1997 | Eady | |
| 5,816,133 A | 10/1998 | Schoenmeyr | |
| 5,993,174 A | 11/1999 | Konishi | |
| 6,055,898 A * | 5/2000 | Rinninger | F04B 43/0054 |
| | | | 92/99 |
| 6,065,389 A | 5/2000 | Riedlinger | |
| 6,183,674 B1 | 2/2001 | Nonogaki | |
| 6,216,731 B1 | 4/2001 | Frenkel | |
| 6,655,257 B1 * | 12/2003 | Meyer | F04B 43/0054 |
| | | | 417/413.1 |
| 6,746,637 B1 | 6/2004 | Huss et al. | |
| 6,776,591 B1 * | 8/2004 | Rinninger | F04B 43/028 |
| | | | 417/437 |
| 7,001,153 B2 | 2/2006 | McDowell et al. | |
| 7,284,964 B2 | 10/2007 | McDowell et al. | |
| 7,704,428 B2 | 4/2010 | Takayama et al. | |
| 8,215,931 B2 | 7/2012 | McDowell et al. | |
| 8,418,364 B2 | 4/2013 | McDowell et al. | |
| 8,496,451 B2 | 7/2013 | Hale | |
| 8,529,223 B2 | 9/2013 | Cohoon et al. | |
| 8,585,372 B2 | 11/2013 | Bacher et al. | |
| 8,639,363 B2 | 1/2014 | Gledhill, III et al. | |
| 9,374,024 B2 | 6/2016 | Nguyen et al. | |
| 9,389,109 B2 | 7/2016 | Gledhill, III et al. | |
| 9,777,720 B2 | 10/2017 | Gledhill, III et al. | |
| 9,828,984 B2 | 11/2017 | Gledhill, III et al. | |
| 9,909,579 B2 | 3/2018 | Gledhill, III et al. | |
| 9,996,089 B2 | 6/2018 | Gledhill, III et al. | |
| 10,330,094 B2 | 6/2019 | Gledhill, III et al. | |
| 10,948,320 B2 | 3/2021 | Gledhill, III et al. | |
| 11,150,118 B2 | 10/2021 | Gledhill, III et al. | |
| 2004/0261536 A1 | 12/2004 | Weisbrodt | |
| 2005/0115402 A1 | 6/2005 | Hembree | |
| 2005/0142005 A1 | 6/2005 | Traylor | |
| 2010/0005655 A1 | 1/2010 | Nguyen | |
| 2011/0180172 A1 | 7/2011 | Gledhill, III et al. | |
| 2011/0311379 A1 | 12/2011 | Hale et al. | |
| 2012/0107150 A1 | 5/2012 | Pawlak et al. | |
| 2015/0211509 A1 | 7/2015 | Gledhill, III et al. | |
| 2018/0087942 A1 | 5/2018 | Gledhill, III et al. | |
| 2018/0291886 A1 | 10/2018 | Gledhill, III et al. | |
| 2018/0298891 A1 | 10/2018 | Gledhill, III et al. | |
| 2019/0017499 A1 | 1/2019 | Gledhill, III et al. | |
| 2019/0234394 A1 | 8/2019 | Gledhill, III et al. | |
| 2020/0386593 A1 | 12/2020 | Nguyen et al. | |
| 2021/0047209 A1 | 2/2021 | Gledhill, III et al. | |
| 2021/0054963 A1 | 2/2021 | Nguyen et al. | |
| 2021/0064735 A1 | 3/2021 | Gledhill, III et al. | |

FOREIGN PATENT DOCUMENTS

| | | |
|---|---|---|
| CN | 102529046 A | 7/2012 |
| DE | 10133349 B4 | 4/2006 |
| DE | 102010042553 A1 | 4/2012 |
| FR | 634537 A | 2/1928 |
| FR | 1355609 A | 3/1964 |
| FR | 2422086 A1 | 11/1979 |
| GB | 304082 A | 1/1929 |
| JP | 06213164 A | 8/1994 |
| JP | 2002/061584 A | 2/2002 |
| JP | 4585405 B2 | 11/2010 |
| WO | WO 2009/103217 A1 | 8/2009 |
| WO | WO 2012/072282 A1 | 6/2012 |
| WO | WO 2013/019017 A1 | 2/2013 |

* cited by examiner

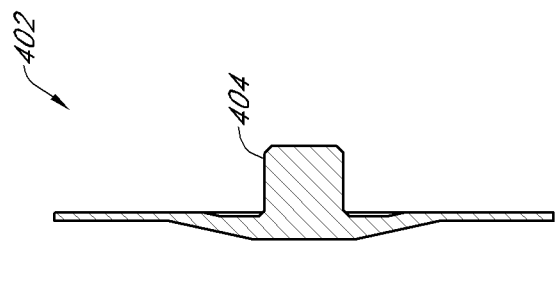
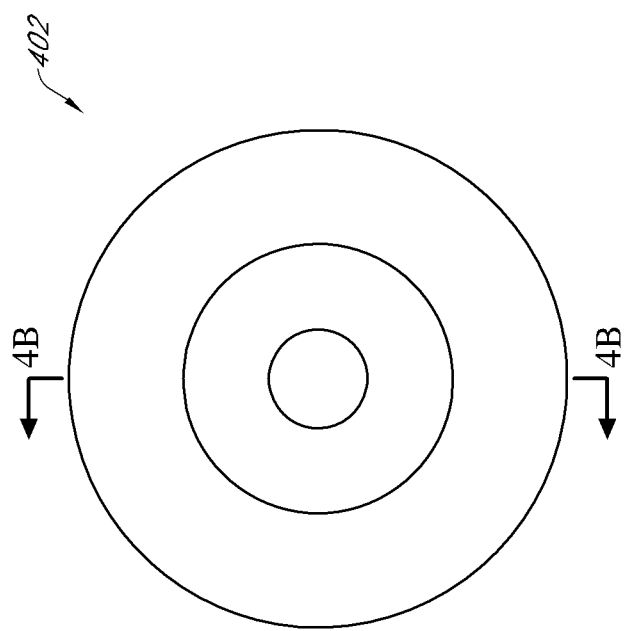
FIG. 4B
FIG. 4A

SEALING DIAPHRAGM AND METHODS OF MANUFACTURING SAID DIAPHRAGM

INCORPORATION BY REFERENCE TO ANY PRIORITY APPLICATIONS

This application is a continuation of U.S. patent application Ser. No. 14/466,211, filed Aug. 22, 2014, titled "SEALING DIAPHRAGM AND METHODS OF MANUFACTURING SAID DIAPHRAGM," which claims the benefit of U.S. Provisional Application No. 61/870,072, filed Aug. 26, 2013, titled "SEALING DIAPHRAGM AND METHODS OF MANUFACTURING SAID DIAPHRAGM," U.S. Provisional Application No. 61/870,679, filed Aug. 27, 2013, titled "SEALING DIAPHRAGM AND METHODS OF MANUFACTURING SAID DIAPHRAGM," U.S. Provisional Application No. 61/919,556, filed Dec. 20, 2013, titled "SEALING DIAPHRAGM AND METHODS OF MANUFACTURING SAID DIAPHRAGM," and U.S. Provisional Application No. 61/875,308, filed Sep. 9, 2013, titled "SEALING DIAPHRAGM AND METHODS OF MANUFACTURING SAID DIAPHRAGM," the entirety of each of which is incorporated herein by reference.

BACKGROUND

Field

The present disclosure relates generally to diaphragm assemblies for an aqueous solution, and methods for manufacturing said diaphragm assemblies.

SUMMARY

Disclosed herein are embodiments of a method for manufacturing a diaphragm assembly comprising forming an insert having a head and a body, wherein the head is located at one end of the body, forming at least one interference surface on the insert, disposing the insert within a cavity configured for injection molding, wherein at least the head is completely disposed within the cavity, and injection molding a polymer onto the insert, wherein the polymer is configured to adhere to the head and the interference surface of the insert.

In some embodiments, forming the at least one interference surface can comprise forming the at least one interference surface at approximately the center of the head of the insert. In some embodiments, forming at least one interference surface can comprise forming a plurality of interference surfaces on the head of the insert. In some embodiments, forming at least one interference surface can comprise tapping at least one hole into the head of the insert to form a blind tapped hole.

In some embodiments, the head can have a diameter greater than the diameter of the body. In some embodiments, at least five pairs of interference surfaces can be formed. In some embodiments, the interference surface can be located on the outside of the head. In some embodiments, the interference surface can comprise threads or grooves.

In some embodiments, the polymer can be a PVDF polymer. In some embodiments, the PVDF polymer can comprise natural PVDF and KYNAR ULTRAFLEX® B. In some embodiments, the PVDF polymer can comprise 0.5% by weight natural PVDF and 99.5% by weight KYNAR ULTRAFLEX® B. In some embodiments, PTFE may not be used.

Also disclosed herein are embodiments of a two part diaphragm assembly comprising an insert having a head and a body, wherein the head is located at one end of the body, at least one interference surface formed on the insert, and an injection-molded polymer diaphragm configured to at least partially surround the head of the insert and interfere with the interference surface.

In some embodiments, the polymer can be semi-transparent. In some embodiments, the polymer can be transparent. In some embodiments, the interference surface can be located approximately at the center of the insert. In some embodiments, the insert can be metal. In some embodiments, the body of the insert can comprise a thread. In some embodiments, the interference surface can be a blind tapped hole.

In some embodiments, the insert can further comprise at least one additional interference surface. In some embodiments, the additional interference surface can be configured as a through hole through the head.

In some embodiments, the at least one interference surface can comprise at least five pairs of interferences surfaces. In some embodiments, the at least one interference surface can comprise four holes approximately equally spaced around the center of the insert and a fifth hole located at the center of the insert. In some embodiments, the interference surface can extend into the body.

In some embodiments, the polymer diaphragm can form an air tight seal around the insert.

In some embodiments, the polymer diaphragm can be a PVDF polymer diaphragm. In some embodiments, the PVDF polymer can comprise natural PVDF and KYNAR ULTRAFLEX® B. In some embodiments, the PVDF polymer can comprise 0.5% by weight natural PVDF, and 99.5% by weight KYNAR ULTRAFLEX® B. In some embodiments, PTFE may not be used.

In some embodiments, the interference surface can have a rounded end. In some embodiments, the interference surface can be located on the outside of the head. In some embodiments, the interference surface can comprise threads or grooves.

Also disclosed herein are embodiments of a positive displacement pump comprising an input channel, an output channel, and a diaphragm assembly located between the input and output channel and configured to translate liquid from the input channel to the output channel, the assembly comprising an insert having a head and a body, wherein the head is located at one end of the body, at least one interference surface formed on the insert, and an injection-molded polymer diaphragm configured to at least partially surround the head of the insert and interfere with the interference surface.

BRIEF DESCRIPTION OF THE DRAWINGS

FIGS. 4A-D illustrate a diaphragm in the prior art.

DETAILED DESCRIPTION

Positive displacement pumps, such as metering pumps, can be used to pump liquids at adjustable flow rates which are precise when averaged over time. Metering pumps include diaphragm metering pumps, peristaltic metering pumps, piston pumps, etc. For metering pumps, motor driven pumps, solenoid diaphragm pumps, and air operated diaphragm pumps can all be used Pistons on a piston pump can move in and out of a chamber, causing the volume of the chamber to become larger and smaller and creating a vacuum. Low pressure causes liquid to enter and fill the chamber, and higher pressure causes the liquid to be expelled from the changer. A metering pump can be useful for measuring a precise volume of liquid in a specified time, thus having an accurate flow rate. Metering pumps can pump water, as well as other chemicals, solutions, and liquids. Metering pumps can be used in high discharge pressure applications.

Disclosed herein are embodiments of a diaphragm assembly, and methods for manufacturing said diaphragm. The diaphragm assembly can be used in, for example, metering pumps, such as those described above. The diaphragm assembly can further be used, for example, in conjunction with elevated or roof top water tanks. In some embodiments, the diaphragm assembly can be used to enable users to have water pressure in their bathrooms and kitchens without expensive pumping equipment. The use of the diaphragm does not limit the disclosure.

In a diaphragm assembly, a diaphragm can be repeatedly moved back and forth to create a vacuum within a chamber to input and output a fluid, such as a gas or a liquid. Therefore, the diaphragm can experience cyclical forces acting on it due to the repeated movement of the diaphragm, such as cyclical bending and cyclical pressure. If not formed properly, the diaphragm may fail due to the cyclical forces acting on it. Accordingly, a diaphragm made from a material with high strength, flexibility, and/or toughness may be advantageous to prevent the diaphragm from fracturing, breaking, cracking, or failing in other aspects. Further, the diaphragm can be manufactured so as to prevent the diaphragm from fracturing, breaking, cracking, or failing in other aspects.

Additionally, a diaphragm assembly may be used in caustic environments, so a diaphragm can have high chemical resistance in some embodiments. For example, diaphragms can be resistant to chlorine and fluorine, although the chemical resistance is not limiting and the diaphragm can be resistant to other chemicals as well.

Prior Diaphragms

Certain diaphragms are currently being used in the marketplace. However, upon a close analysis of the current diaphragms, significant problems can be uncovered. A summary of some of the diaphragms currently in use, and their drawbacks, are described in detail below.

Figure 1C:
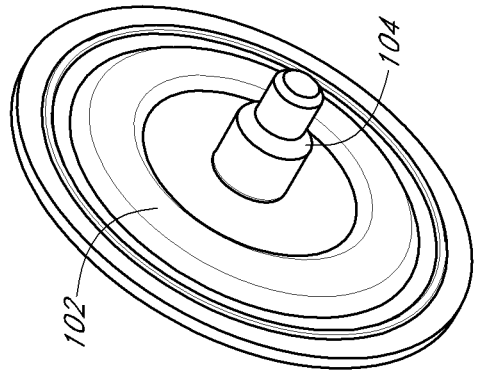
FIGS. 1A-E illustrate a diaphragm in the prior art.
Figure 1B:
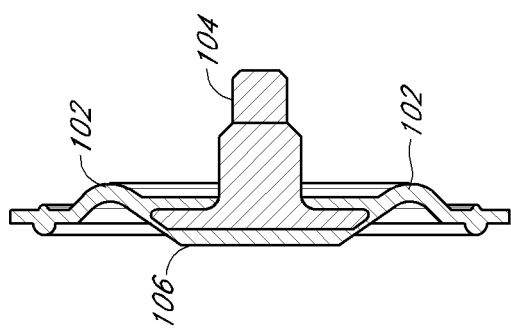
Figure 1A:
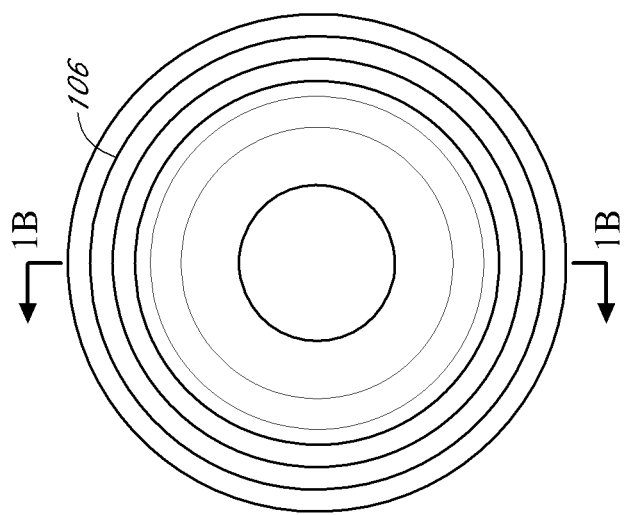
Figure 1E:
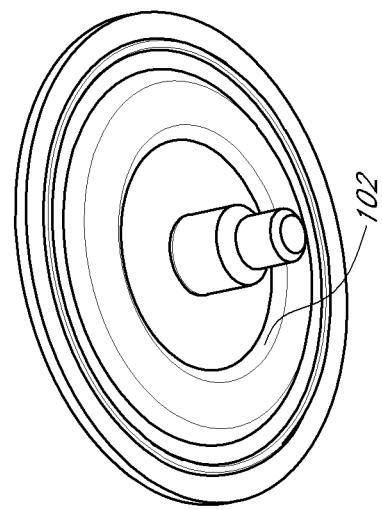
Figure 1D:
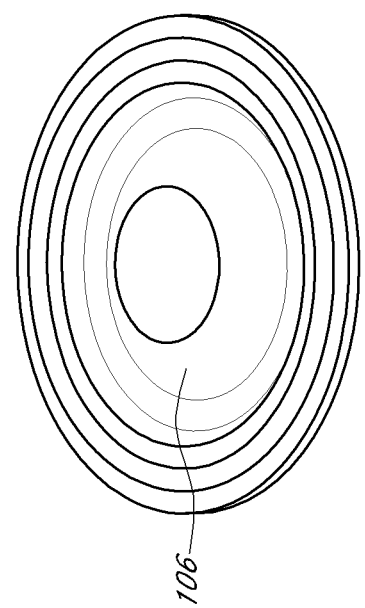

FIG. 1A-E illustrates a diaphragm 100 used in the prior art. As shown in FIG. 1B, rubber coating 102 surrounds a metal insert 104. The rubber coating is then covered by a layer of polytetrafluoroethylene (PTFE) 106. The metal insert has a flat and disc-shaped head 108 which is covered by the rubber coating 102. Further, Dacron®, or other similar fabric material, must cover the entire surface of the rubber 102 to increase the overall strength. FIGS. 1A and C-E illustrate further views of the diaphragm However, there are numerous drawbacks to the diaphragm described in FIGS. 1A-E. For example, the diaphragm utilizes numerous parts and materials (e.g. metal insert 104, rubber coating 102, PTFE 106). This requires the purchase of numerous types of materials to manufacture the diaphragm. Further, the numerous parts and materials need to adhere to one another properly during operating of the diaphragm. Typically, an adhesive is used to connect all of the parts together. Adhesion can become a serious problem as repeated motion of the diaphragm 100 can lead to loosening of the adhesive, followed by failure, leading to breakage of the overall device that the diaphragm is being used with.

Further, as mentioned above, PTFE needs to coat the entirety of the rubber. If the PTFE 106 does not fully and properly coat the rubber 102, many types of chemicals will eat through the rubber 102, rendering the diaphragm useless.

The manufacturing process for making the diaphragm of FIG. 1 is difficult as well. Specifically, manufacturing requires precise machining of uniform thin walls. Further, the PTFE 106 must be free from imperfections (such as wrinkles and voids), must cover the entire surface of the rubber 102, and must be minimally thick (approximately 0.014-0.016 inches). The rubber 102 is also required to be compression molded. Other manufacturing difficulties, such as sand blasting the insert 104 for improved adhesion between layers also increases the manufacturing price. Because of the difficult manufacturing requirements, even specialized companies have a rejection rate that can be as high as 15%.

Figure 2A:
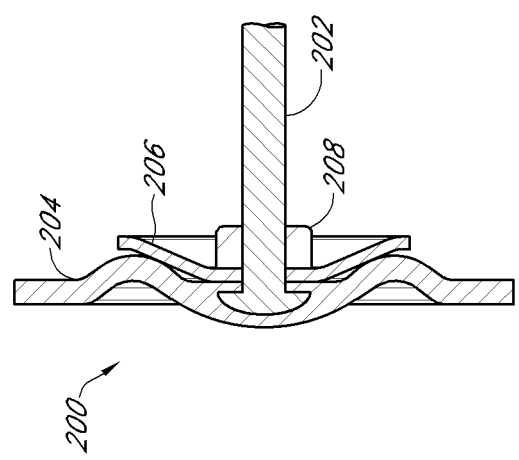
FIGS. 2A-C illustrate a diaphragm in the prior art.
Figure 2C:
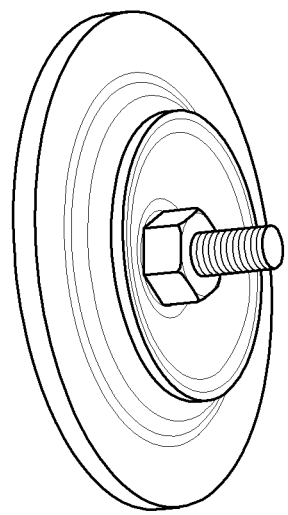
Figure 2B:
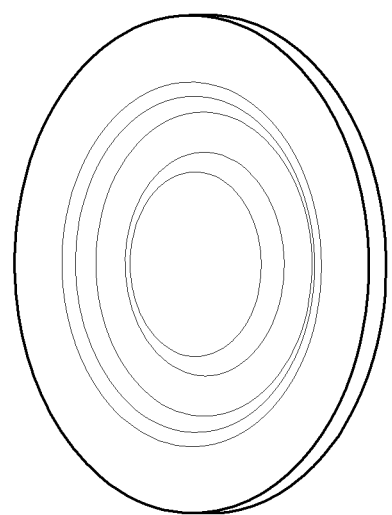

FIGS. 2A-C illustrate a different diaphragm used in the prior art. As shown in FIG. 2A, the diaphragm 200 contains multiple pieces. A screw 202 is surrounded by a material layer 204 and rests on a washer 206 which in turn rests on a nut 208. The material layer 204 is similar to the diaphragm described in FIG. 1 and contains a rubber, fabric, adhesive, and PTFE coating. The washer 206 is used to reinforce the material layer 204, and the nut 208 is used to hold the washer 206 in place. FIGS. 2B-C illustrate views of the front and back of this diaphragm.

Similar to the diaphragm described with respect to FIG. 1, diaphragm 200 has numerous drawbacks. For example, the diaphragm utilizes numerous parts and materials (e.g. screw 202, rubber coating and PTFE 204, wash 206, and nut 208). This requires the purchase of numerous types of materials to manufacture the diaphragm. Along the same lines, the numerous parts and materials need to adhere to one another properly, typically with an adhesive. This can become a serious problem as repeated motion of the diaphragm 200 can lead to loosening of the adhesive, followed by failure. Additionally, if the PTFE does not fully and properly coat the rubber, many types of chemicals will eat through the rubber, rendering the diaphragm useless.

The manufacturing process for making the diaphragm of FIG. 2 is difficult as well. For example, manufacturing of the prior art diaphragms requires precise machining of uniform thin walls. Further, the PTFE must be free from imperfections (such as wrinkles and voids), must cover the entire surface of the rubber, and must be minimally thick. Because of the difficult manufacturing requirements, even specialized companies have a rejection rate that can be as high as 15%. Thus, numerous parts are wasted, increasing the overall cost of making the prior art diaphragms.

Figure 3:
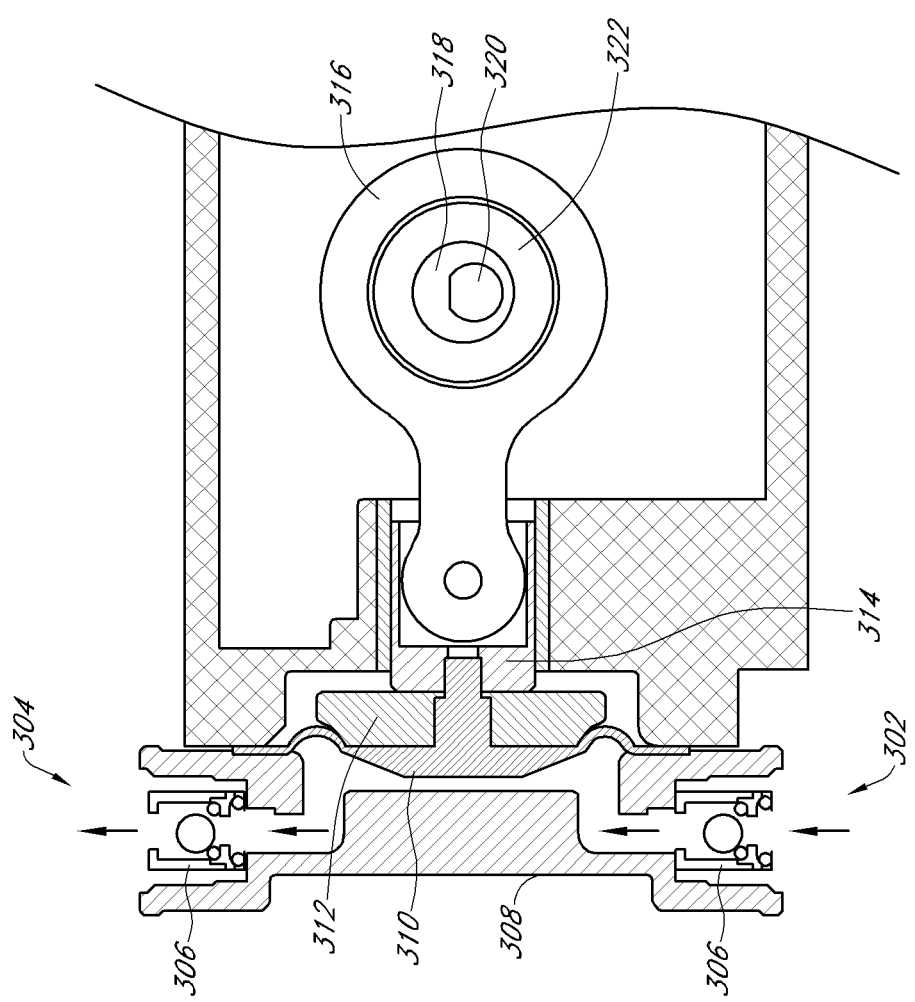
FIG. 3 illustrates a diaphragm system in the prior art.

FIG. 3 illustrates a diaphragm system according to the prior art. As shown, there is an inlet 302 for receiving a liquid and an outlet 304 for discharging the liquid. Each of the inlet and outlet 302/304 have a one way check valve 306 to prevent the liquid from back flowing. Between the inlet and outlet 302/304 are a pump head 308 and a diaphragm 310 located on a washer 312. The washer 312 and/or diaphragm 310 is attached to a piston 314 which produces suction between the inlet and outlet 302/304. The piston is attached to a combination of pieces for moving the piston, such as a yoke assembly 316, cam 318, motor shaft 320, and bearing 322. Diaphragms, such as those described with respect to the prior art figures, can be used as the diaphragm 310.

Figure 4D:
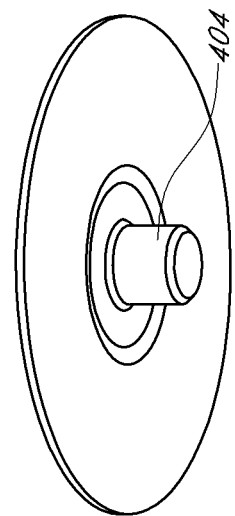
Figure 4C:
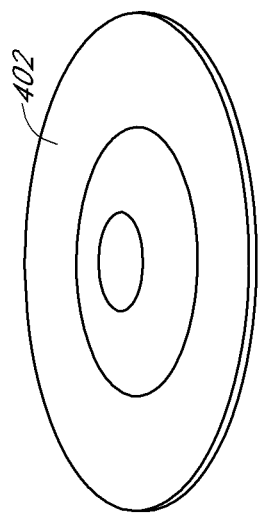

FIGS. 4A-D illustrate a different diaphragm in the prior art. FIGS. 4A-B illustrate a single piece diaphragm 402 made entirely out of PTFE. In most cases, the diaphragm 402 is also used with a backup washer (not shown). The diaphragm 402 can contain threading 404. FIGS. 4C-D illustrate other views of the front and back of the diaphragm.

Again, there are significant problems with this type of diaphragm. PTFE is a very expensive material, and making a one piece diaphragm requires machining out of a large block or rod of the PTFE. This is a very inefficient process, and much of the PTFE is wasted during manufacturing. The PTFE cannot be injection molded, and must be machined. Further, to manufacture the single piece PTFE diaphragm, precise machining is needed to form the uniform walls, which is a very difficult process. Moreover, this type of diaphragm is limited to a smaller overall diaphragm diameter due to limitations in machining capabilities. Even with a smaller diameter, distortion can still occur during machining.

Figure 5C:
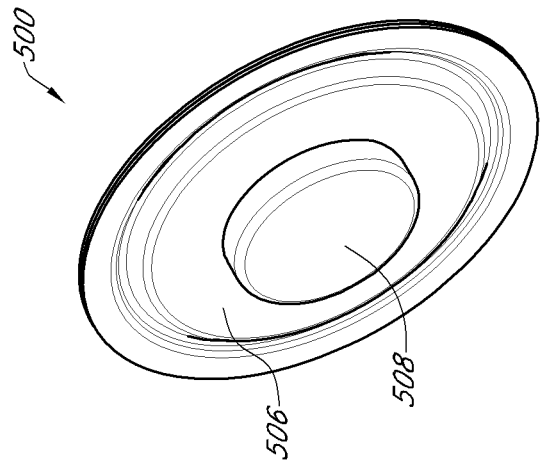
FIGS. 5A-E illustrate a diaphragm in the prior art.
Figure 5B:
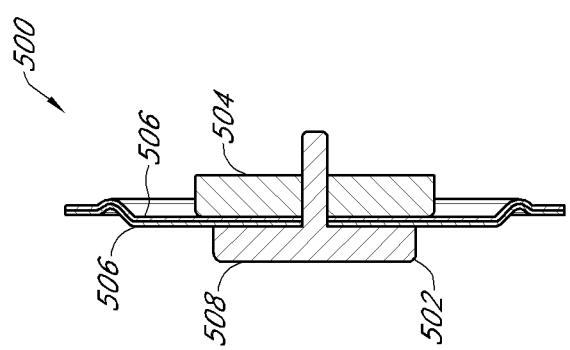
Figure 5A:
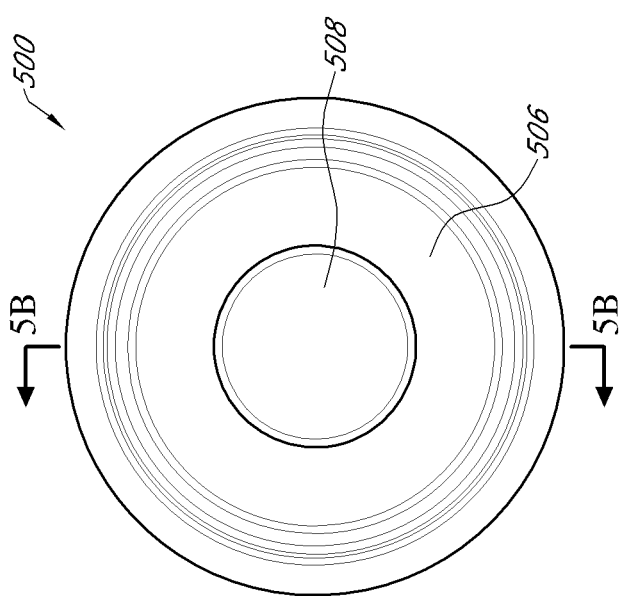
Figure 5E:
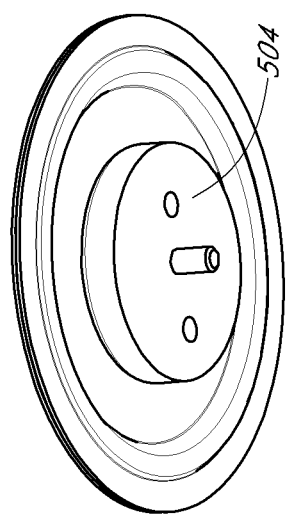
Figure 5D:
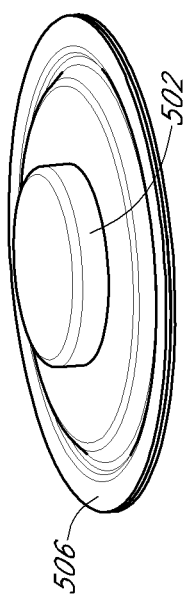

FIGS. 5A-D illustrate a different diaphragm in the prior art. As shown in FIG. 5B, the diaphragm 500 is made up of a threaded insert 502, a washer 504 with a threaded center hole, and a pair of PTFE sheets 506. The PTFE sheets 506 are 0.03 to 0.06 inches in thickness each, and are manufactured by stamping using a compression forming tool. The threaded insert 502 has a circular head 508 which is used to sandwich the PTFE sheets 506 between the circular head 508 and the washer 504. The surface of the circular head 508 is coated for increased chemical resistance. FIGS. 5A and C illustrate other viewpoints of the diaphragm and FIGS. 5D-E illustrate other views of the diaphragm.

As with the other prior art diaphragms, diaphragm 500 has numerous drawbacks associated with it. Diaphragm 500 requires multiple pieces and material. In fact, numerous pieces need to be machine during manufacturing. Further, the diaphragm 500 relies on water tight/air tight seals between the threaded insert 502, PTFE sheets 506, and washer 504. This water tight/air tight seal is a weak point which can be broken. The seal can become a serious problem as repeated motion of the diaphragm 500 can lead to loosening of the seal, followed by failure. The diaphragm 500 also requires a separate chemical coating on the head 508. In addition, the PTFE sheets 506 must be cut and formed using a compression tool, and a forming tool needs to be used as well.

Diaphragm Assemblies

Figure 6B:
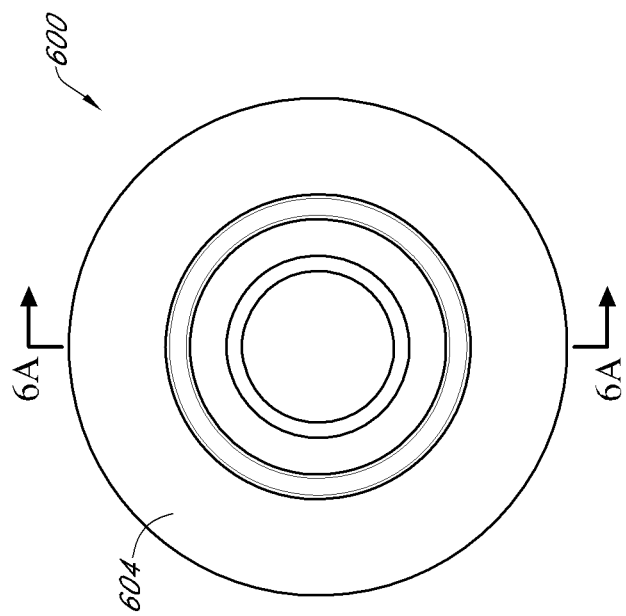
FIGS. 6A-D illustrate an embodiment of a diaphragm according to the disclosure.
Figure 6A:
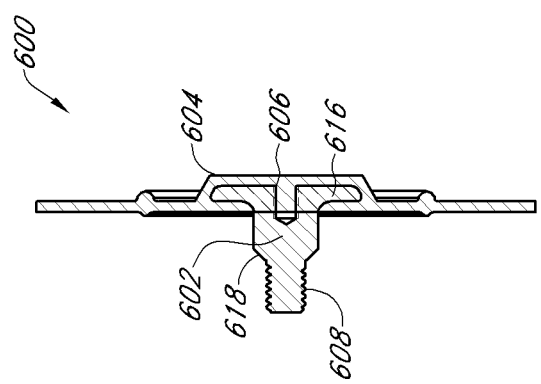

FIGS. 6A-D illustrate an embodiment of a diaphragm assembly according to the present disclosure. FIG. 6A shows a side cross section of a diaphragm assembly 600. As shown, the diaphragm assembly 600 can be formed from a two part system, though other parts can be used as well and the number of parts does not limit the disclosure. In some embodiments, there can be an insert 602 surrounded by a polymer diaphragm 604. The insert 602 can contain at least one tapped hole 606, or other interference surface. The tapped hole 606 can be formed with screw retention surfaces, or other types of interference surfaces, and the type of tapping of the tapped hole 606 does not limit the disclosure. In some embodiments, the tapped hole 606 can be centered on the insert 602. In some embodiments, the tapped hole 606 can be located outside of the center of the insert 602. In some embodiments, the tapped hole 606 can be a blind tapped hole. In some embodiments, more than one tapped hole 606 can be used.

Figure 6D:
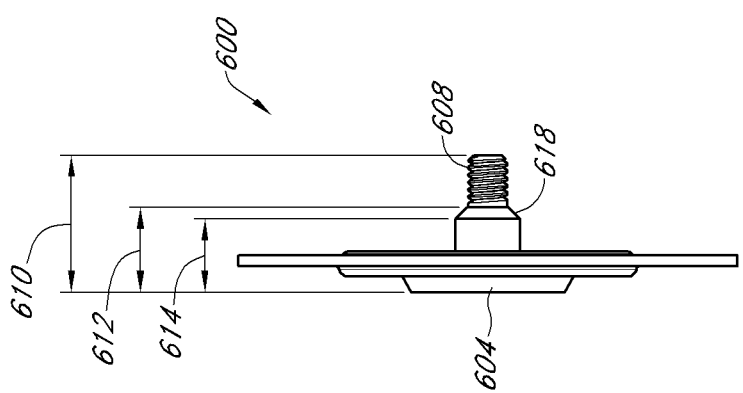
Figure 6C:
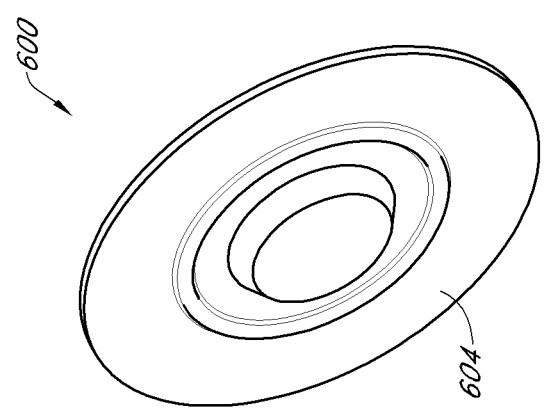

The tapped hole 606 can extend at least 0.10, 0.15, 0.20, 0.25, 0.30, 0.35, or 0.40 inches into the insert 602, though the dimensions are not limiting. The tapped hole 606 can extend to a distance less than the length of a head of the insert 602 or less than the total length of the insert 602. The tapped hole 606 can extend at least 0.10 inches, and can be less than 2 inches, although none of the dimensions limit the disclosure. FIGS. 6B-C illustrate different viewpoints of an embodiment of a diaphragm assembly 600. FIG. 6D illustrates a side view of the diaphragm assembly 600, similar to FIG. 6A but without a cut out.

In some embodiments, the insert 602 and polymer diaphragm 604 can be approximately 0.5, 1.0, 1.045, or 1.5 inches in length 610. The threaded portion 608 and can be at least approximately 0.1, 0.2, 0.3, 0.40, 0.5, or 0.6 inches in length, and the rest of the insert 602 and polymer diaphragm 604 can be approximately 0.1, 0.2, 0.3, 0.4, 0.5, 0.6, 0.645, 0.7, 0.8, 0.9, or 1 inches in length 612. As discussed below, in some embodiments, the insert 602 can have a narrowing portion 618 between the threaded portion 608 and a head portion 616. The length of the polymer diaphragm 604 to the beginning of the narrowing portion 618 can be approximately 0.1, 0.2, 0.3, 0.4, 0.5, 0.560, 0.6, or 0.7 inches 614. None of the above dimensions are limiting.

FIGS. 7A-D illustrate an embodiment of an insert, such as the one described above with respect to FIG. 6. The insert 702 can be, for example, metals such as aluminum or brass. The insert 702 could also be formed from material such as, for example, polymers, ceramics, or composites of different materials. The type of material forming the insert 702 does not limit the disclosure. In some embodiments, the insert 702 can be formed from a single material or multiple materials. In some embodiments, the insert 702 can be formed by machining, though the manufacturing method does not limit the disclosure.

Figure 7B:
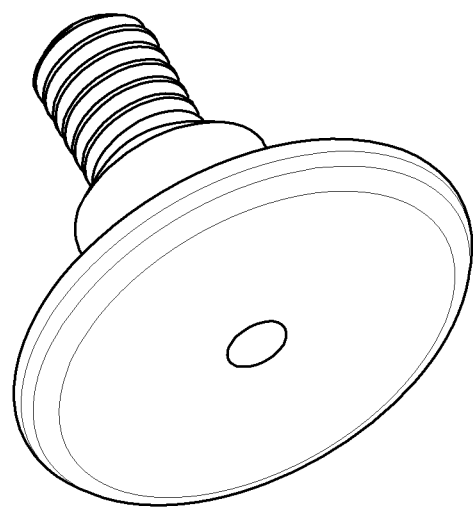
FIGS. 7A-D illustrate an embodiment of an insert according to the disclosure.
Figure 7A:
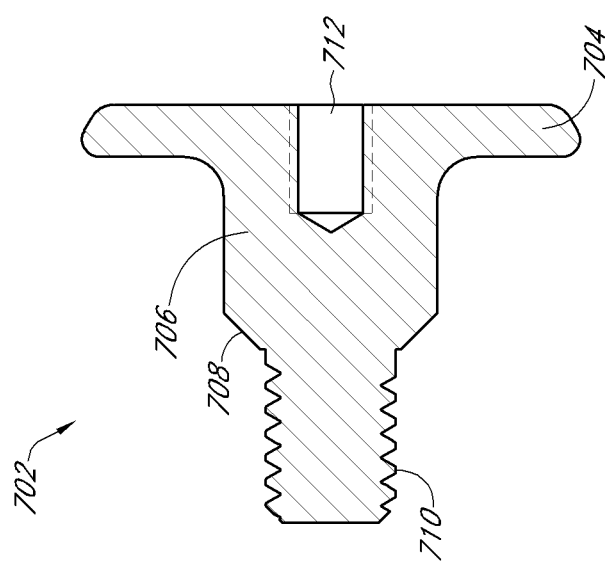

As shown in FIG. 7A, in some embodiments the insert 702 can have a head portion 704, a body portion 706, a narrowing portion 708, and a threaded portion 710, though other portions can be used as well. The head portion 704 can be generally circular in shape, though the shape is not limiting and can be, for example, rectangular, triangular, or ovaloid. In some embodiments, the head portion 704 can be wider than the other portions. For example, in some embodiments the head portion 704 is approximately 1.0, 1.1, 1.149, 1.2, 1.3, 1.4, or 1.5 inches in diameter, or at least 0.5 inches in diameter. In some embodiments, the diameter of the head portion 704 as compared to the diameter of a polymer diaphragm, such as described above with respect to FIG. 6, can be approximately 1:1, 1:1.5, 1:2, 1:3, 1:4, 1:5, 1:6, 1:7, 1:8, 1:9, or 1:10. In some embodiments, the head portion 704 can have a thickness of approximately 0.05, 0.1, 0.120, 0.2, 0.3, 0.4, or 0.5 inches. However, the size of the head portion 704 does not limit the disclosure.

Further, the head portion 704 can have a tapped hole 712. This tapped hole 712 can be located in the center of the head portion 704, or not in the center of the head portion 704. In some embodiments, the tapped hole 712 can be approximately circular, though the shape of the tapped hole 712 does not limit the disclosure. In some embodiments, the tapped hole 712 can be a blind tapped hole. In some embodiments, the tapped hole 712 can end in a flat surface, a rounded surface, or a pointed surface, and the type of surface does not limit the disclosure. In some embodiments, the tapped hole 712 can be approximately 0.10, 0.15, 0.20, 0.25, 0.30, 0.35, or 0.40 inches deep. In some embodiments, the tapped hole 712 can be threaded. In some embodiments, more than one tapped hole 712 can be used.

The body portion 706 can follow the head portion 704. In some embodiments, the tapped hole 712 can enter the body portion 706, although in other embodiments it does not. The body portion 706 can be generally cylindrical in shape, though the shape of the body portion 706 does not limit the disclosure. In some embodiments, the body portion 706 can have a diameter of approximately 0.1, 0.2, 0.3, 0.4, 0.492, 0.5, 0.6, 0.7, or 0.8 inches. The distance from the far end of the head portion 704 to the opposite end of the body portion 706 can be approximately 0.1, 0.2, 0.3, 0.4, 0.480, 0.5, 0.6, or 0.7 inches.

In some embodiments, following the body portion 706 can be the narrowing portion 708. The narrowing portion 708 can reduce the overall diameter of the insert 702. In some embodiments, the narrowing portion 708 can have a generally smooth shape, and in some embodiments the narrowing portion 708 has a step wise shape. The shape of the narrowing portion 708 does not limit the disclosure. The distance from the far end of the head portion 704 to the opposite end of the narrowing portion 708 can be approximately 0.1, 0.2, 0.3, 0.4, 0.5, 0.565, 0.6, 0.7, 0.8, 0.9, or 1.0 inches. In some embodiments, the total length of the insert 702 can be approximately 0.5, 0.7, 0.9, 0.965, 1.0, 1.5, or 2 inches. The total length of the insert 702 does not limit the disclosure. In some embodiments, the insert 702 may not have a narrowing portion 708, and the body portion 706 can flow directly into the threaded portion 710.

Figure 7D:
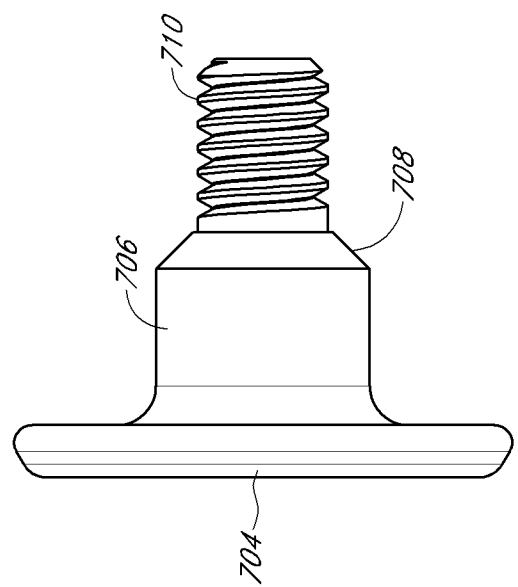
Figure 7C:
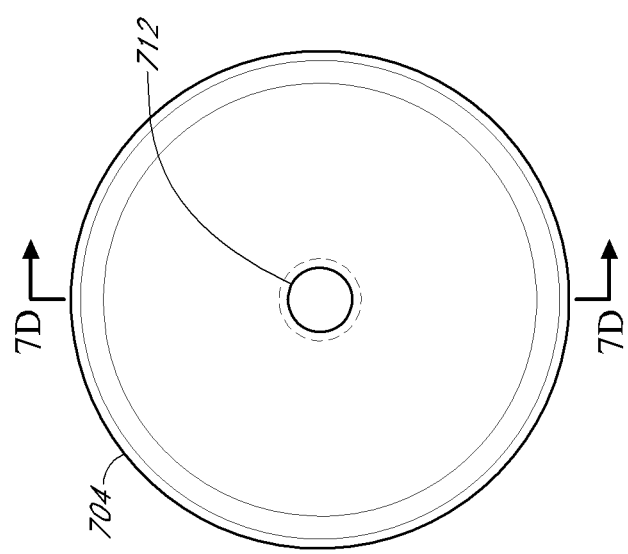

In some embodiments, the portion following the narrowing portion 708 can be the threaded portion 710. In some embodiments, the threaded portion 710 can be an interference surface. The threaded portion 710 can have a diameter less than both the head portion 704 and the body portion 706, though this does not limit the disclosure. The threaded portion can be configured to mate with a pump, such as the pump used in the prior art shown as FIG. 3. However, the attachment of the insert 702 to a pump does not limit the disclosure, and any type of attachment means can be used. FIGS. 7B-D illustrate different viewpoints of the insert 702.

Figure 8B:
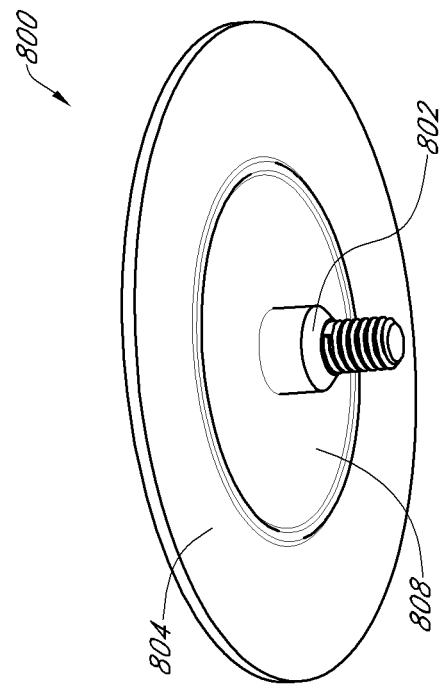
FIGS. 8A-B illustrate an embodiment of a diaphragm according to the disclosure.
Figure 8A:
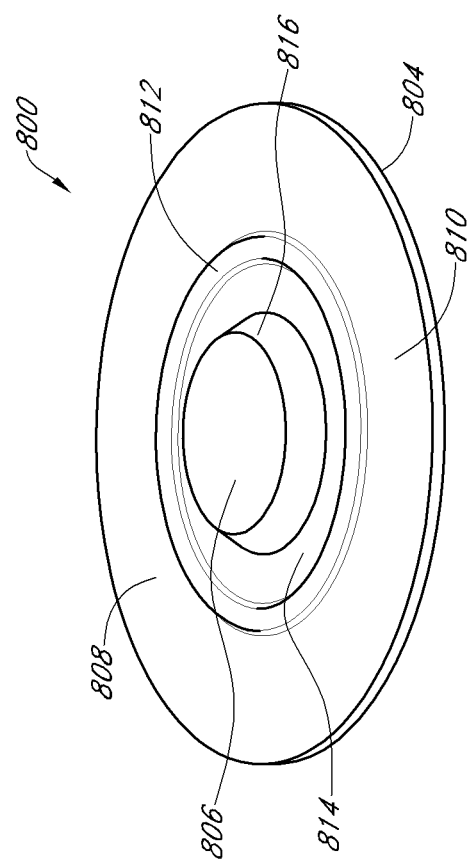

FIGS. 8A-B show an embodiment of a disclosed diaphragm assembly, such as the ones described above. As shown, the diaphragm assembly 800 can be generally circular shaped. The polymer diaphragm 804 can be located both above and below a head portion 704 of the insert 802 so that the head is fully encompassed by the polymer diaphragm. As shown in FIGS. 8A-B, the head portion 704 of the insert 802 cannot be seen from the outside. In some embodiments, the polymer diaphragm 804 can be generally flat one the back side 808. In some embodiments, there can be some curvature or step features on the back side 808.

On the front side 810, the outer circumference 810 of the polymer diaphragm 804 can have a first thickness. Moving towards the center, the polymer diaphragm 804 can have a step up 812 to a second thickness 814. There can then be a second step up 816 occurring at the insert 802, so that the head of the insert 802 is fully covered. In some embodiments, the front side 810 can have a generally smooth taper.

As described above, a tapped hole can be formed in the insert. This tapped hole can be advantageous for increasing the overall adherence of the polymer diaphragm onto the insert. The polymer diaphragm can wrap around the head of the insert as well as inserting into the tapped hole during manufacturing. If a tapped hole is used, the polymer diaphragm has more surface area to adhere to the insert. In some embodiments, the tapped hole is threaded, or given another type of interference surface, providing for even more surface area for adhesion. Further, diaphragm that is inserted into the tapped hole can exert force on the sides of the tapped hole, thereby increasing the adhesion between the polymer diaphragm and the insert. The increased adhesion allows for larger insert heads to be used. Unexpectedly, the use of at least one tapped hole can allow for the polymer diaphragm to be manufactured using injection molding, instead of compression molding, which can be advantageous for manufacturing.

Figure 9B:
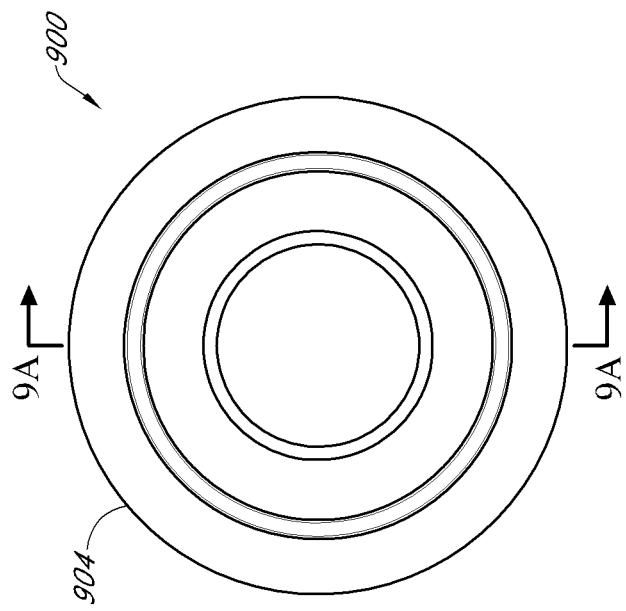
FIGS. 9A-B illustrate an embodiment of a diaphragm according to the disclosure.
Figure 9A:
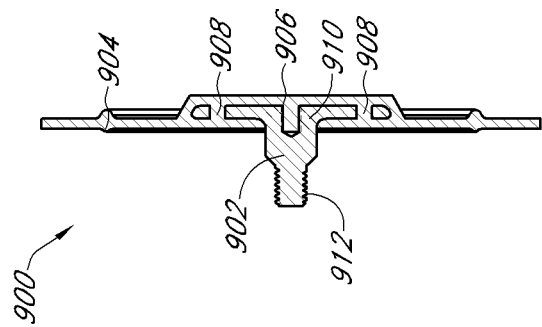

FIGS. 9A-B illustrate an embodiment of a diaphragm assembly according to the present disclosure. FIG. 9A illustrates a cut-out side view of an embodiment of the diaphragm assembly 900. As shown, the diaphragm assembly 900 can be formed from a two part system, though other parts can be used as well and the number of parts does not limit the disclosure. In some embodiments, there can be an insert 902 surrounded by a polymer diaphragm 904. The insert 902 can contain at least one tapped hole 906. The tapped hole 906 can be formed with screw retention surfaces, or other types of interference surfaces, and the type of tapping of the tapped hole 906 does not limit the disclosure. In some embodiments, the tapped hole 906 can be centered on the insert 902. In some embodiments, the tapped hole 906 can be located outside of the center of the insert 902. In some embodiments, the tapped hole 906 can be a blind tapped hole. In some embodiments, more than one tapped hole 906 can be used. The tapped hole 906 can extend approximately 0.10, 0.15, 0.20, 0.25, 0.30, 0.35, or 0.40 inches into the insert 902, though the dimensions are not limiting.

In some embodiments, at least one bonding hole 908 can be formed in the insert 902. In some embodiments, a plurality of bonding holes 908 can be formed in the insert. Specifically, the bonding holes 908 can be formed at the head 910 of the insert 902. The bonding holes 908 can pass completely through the head 910, or can pass only partially through the head 910. The bonding holes 908 can be on either side of the head 910, or can be on both sides of the head 910 if they only partially pass through the head 910. In some embodiments, the bonding holes 908 can have a similar shape and diameter as the tapped hole 906. In some embodiments, the 908 can include interference surfaces, such as tapping. In some embodiments, 1, 2, 3, 4, 5, 6, 7, 8, 9, or 10 bonding holes 908 can be used. In some embodiments, at least 1 bonding hole 908 can be used, though the number of bonding holes 908 is not limiting. In some embodiments, the bonding holes 908 can be spaced evenly around the head 910. In some embodiments, the bonding holes 908 can be located generally random around the head 910.

As shown in FIG. 9B, the polymer diaphragm 904 can have a diameter of approximately 1, 1.5, 2, 2.5, 3, 3.5, 4, 4.5, 4.800, 5, 5.5, or 6 inches. In some embodiments, the polymer diaphragm 904 can have a thickness of approximately 0.05, 0.100, 0.15, 0.2, 0.25, 0.3, or 0.4 inches at its far circumference. In some embodiments, the diaphragm 904 can have a thickness of at least 0.01, 0.05, 0.15, 0.2, or 0.25 inches thick, although the thickness is not limiting.

FIGS. 10A-D illustrate an embodiment of an insert, such as the one described above with respect to FIG. 9. The insert 1002 can be, for example, metals such as aluminum or brass. The insert 1002 could also be formed from material such as, for example, polymers, ceramics, or composites of different materials. The type of material forming the insert 1002 does not limit the disclosure. In some embodiments, the insert 1002 can be formed from a single material or multiple materials. In some embodiments, the insert 1002 can be formed by machining, though the manufacturing method does not limit the disclosure.

Figure 10B:
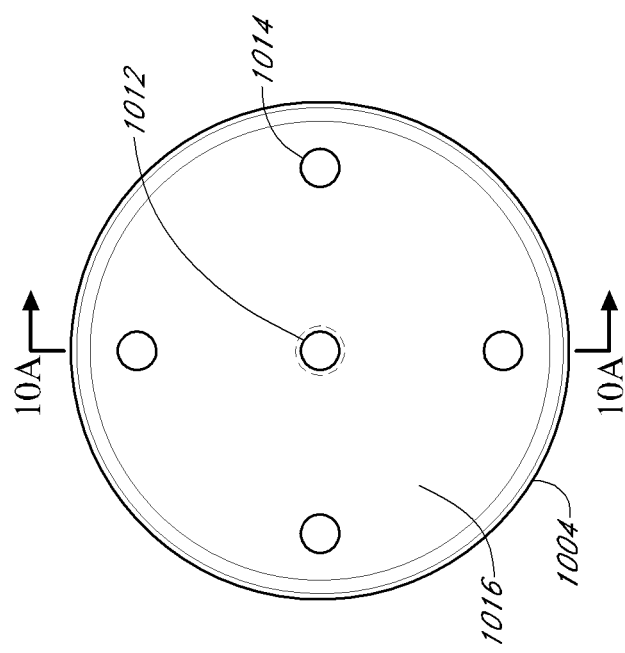
FIGS. 10A-D illustrate an embodiment of an insert according to the disclosure.
Figure 10A:
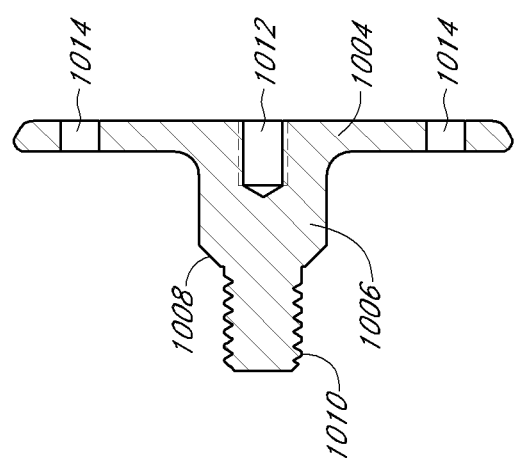

As shown in FIG. 10A, in some embodiments the insert 1002 can have a head portion 1004, a body portion 1006, a narrowing portion 1008, and a threaded portion 1010, though other portions can be used as well. The head portion 1004 can be generally circular in shape, though the shape is not limiting and can be, for example, rectangular, triangular, or ovaloid. In some embodiments, the head portion 1004 can be wider than the other portions. For example, in some embodiments the head portion 1004 is approximately 1.5, 1.6, 1.7, 1.8, 1.9, 1.919, 2.0, 2.1, 2.2, or 2.3 inches in diameter.

Further, the head portion 1004 can have a tapped hole 1012. This tapped hole 1012 can be located in the center of the head portion 1004, or not in the center of the head portion 1004. In some embodiments, the tapped hole 1012 can be approximately circular, though the shape of the tapped hole 1012 does not limit the disclosure. In some embodiments, the tapped hole 1012 can end in a flat surface, a rounded surface, or a pointed surface, and the type of surface does not limit the disclosure. In some embodiments, the tapped hole 1012 can be a blind tapped hole. In some embodiments, the tapped hole 1012 can be approximately 0.1, 0.2, 0.25, 0.3, 0.4, 0.5, or 0.6 inches deep. In some embodiments, the tapped hole 1012 can be threaded. In some embodiments, more than one tapped hole 1012 can be used.

In some embodiments, the insert 1002 can have at least one bonding hole 1014. In some embodiments, the insert 1002 can have a plurality of bonding holes 1014. The insert 1002 can have 1, 2, 3, 4, 5, 6, 7, 8, 9, or 10 bonding holes 1014. The bonding holes 1014 can have a diameter of about 0.05, 0.10, 0.15, 0.20, 0.30, 0.40, or 0.50 inches. If there is more than one bonding hole 1014, the bonding holes 1014 can be equally spaced apart from one another. In some embodiments, the bonding holes 1014 may not be equally spaced apart from one another. In some embodiments, the bonding holes 1014 are centered 1016 around the tapped hole 1012 at a diameter of 1.0, 1.1, 1.2, 1.3, 1.4, 1.41, 1.5, 1.6, or 17 inches from one another. In some embodiments, the bonding holes 1014 go all the way through the head portion 1004 of the insert 1002, and in other embodiments the head portion 1004 go partially through the head portion 1004.

The body portion 1006 can follow the head portion 1004. In some embodiments, the tapped hole 1012 can enter the body portion 1006, although in other embodiments it does not. The body portion 1006 can be generally cylindrical in shape, though the shape of the body portion 706 does not limit the disclosure. In some embodiments, the body portion 1006 can have a diameter of approximately 0.1, 0.2, 0.3, 0.4, 0.492, 0.5, 0.6, 0.7, or 0.8 inches. The distance from the far end of the head portion 1004 to the opposite end of the body portion 1006 can be approximately 0.1, 0.2, 0.3, 0.4, 0.480, 0.5, 0.6, or 0.7 inches.

In some embodiments, following the body portion 1006 can be the narrowing portion 1008. The narrowing portion 1008 can reduce the overall diameter of the insert 1002. In some embodiments, the narrowing portion 1008 can have a generally smooth shape, and in some embodiments the narrowing portion 1008 has a step wise shape. The shape of the narrowing portion 1008 does not limit the disclosure. The distance from the far end of the head portion 1004 to the opposite end of the narrowing portion 1008 can be approximately 0.1, 0.2, 0.3, 0.4, 0.5, 0.565, 0.6, 0.7, 0.8, 0.9, or 1.0 inches. The total length of the insert 1002 can be approximately 0.5, 0.6, 0.7, 0.8, 0.9, 0.965, 1.0, 1.2, 1.3, 1.4, or 1.5 inches. In some embodiments, the insert 1002 may not have a narrowing portion 1008, and the body portion 1006 can flow directly into the threaded portion 1010.

Figure 10D:
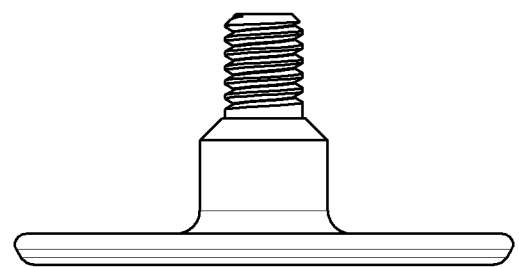
Figure 10C:
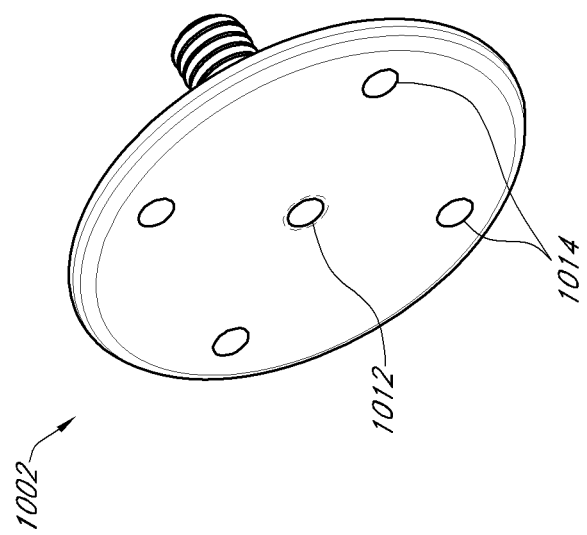

In some embodiments, the portion following the narrowing portion 1008 can be the threaded portion 1010. In some embodiments, the threaded portion 1010 can be an interference surface. The threaded portion 1010 can have a diameter less than both the head portion 1004 and the body portion 1006, though this does not limit the disclosure. The threaded portion 1010 can have a diameter of approximately 0.1, 0.2, 0.3, 0.4, 0.492, 0.5, 0.6, or 0.7 inches. The threaded portion can be configured to mate with a pump, such as the pump used in the prior art shown as FIG. 3. However, the attachment of the insert 1002 to a pump does not limit the disclosure, and any type of attachment means can be used. FIGS. 10B-D illustrate different viewpoints of the insert 1002.

Figure 11B:
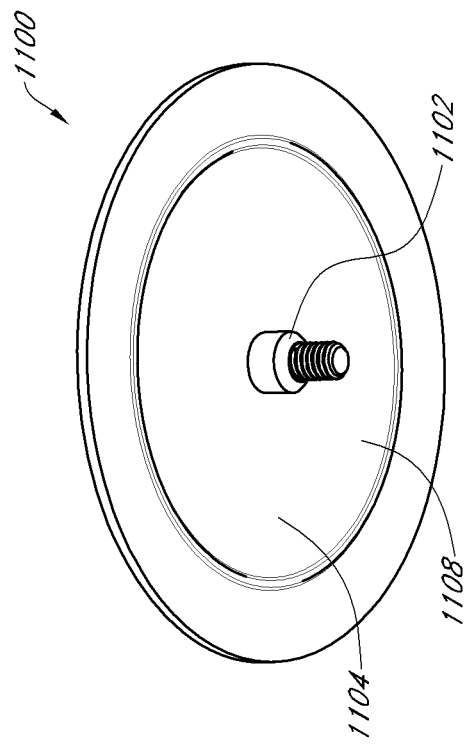
FIGS. 11A-B illustrate an embodiment of a diaphragm according to the disclosure.
Figure 11A:
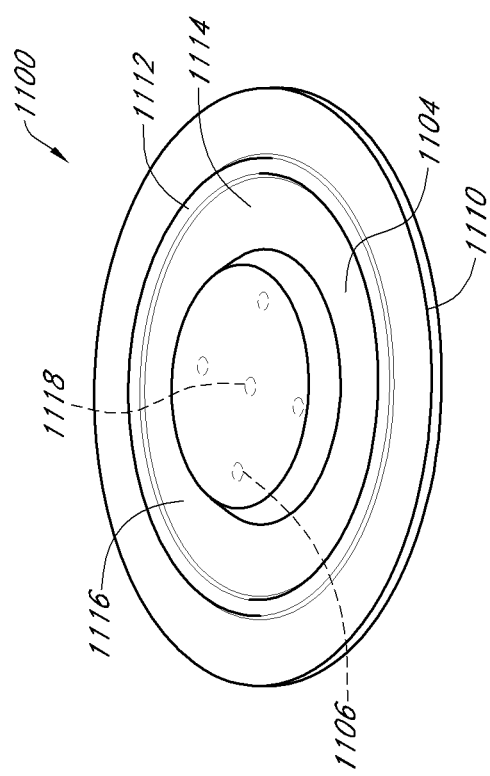

FIGS. 11A-B show pictures of an embodiment of a disclosed diaphragm assembly, such as the ones described above. As shown, the diaphragm assembly 1100 can be generally circular shaped. The polymer diaphragm 1104 can be located both above and below a head portion of the insert 1102 so that the head is fully encompassed by the polymer diaphragm 1104. As shown in FIGS. 11A-B, the head portion 704 of the insert 1102 cannot be seen from the outside. In some embodiments, the polymer diaphragm 1104 can enter a tapped hole 1118 of the insert 1102, additionally securing the polymer diaphragm 1104 to the insert 1102. In some embodiments, the polymer diaphragm 1104 can enter bonding holes 1106 of the insert 1102, thereby additionally securing the polymer diaphragm 1104 to the insert 1102. In some embodiments, the polymer diaphragm 1104 can be generally flat one the back side 1108 as shown in FIG. 11B. In some embodiments, there can be some curvature or step features on the back side 1108.

On the front side shown in FIG. 11A, the outer circumference 1110 of the polymer diaphragm 1104 can have a first thickness. Moving towards the center, the polymer diaphragm 1104 can have a step up 1112 to a second thickness 1114. There can then be a second step up 1116 occurring at the insert 1102, so that the head of the insert 1102 is fully covered. In some embodiments, the front side can have a generally smooth taper.

As described above, the use of a tapped hole and at least one bonding hole can be used on the insert. These holes can be advantageous for increasing the overall adherence of the polymer diaphragm onto the insert. If a tapped hole is used, the polymer diaphragm has more surface area to adhere to the insert. The polymer diaphragm can wrap around the head of the insert as well as inserting into the tapped hole during manufacturing. In some embodiments, the tapped hole is threaded, or given another type of interference surface, providing for even more surface area for adhesion. Further, the tapped hole can apply pressure to polymer diaphragm that is inserted into the hole, thereby increasing the adhesion between the polymer diaphragm and the insert.

In addition, the bonding holes allows for the polymer to fully connect around the insert, such as in FIG. 9B, thus entrapping the insert within the polymer. Therefore, the polymer has increased strength and binding to the insert. The increased adhesion allows for larger insert heads to be used. Unexpectedly, the use of the additional holes can allow for the polymer diaphragm to be manufactured using injection molding, instead of compression molding.

Externally Threaded Insert

In some embodiments, the polymer diaphragm assembly can contain an insert with an interference surface on the external surface of head. In some embodiments, the insert with the interference surface on the outside surface of the head can be used in conjunction with a threaded blind hole, such as those described above. In some embodiments, the insert with the interference surface on the outside surface of the head can be used instead of a threaded blind hole. For example, the interference surface can be a recessed surface, or multiple recessed surfaces, separated by surfaces having a greater maximum dimension or diameter. In some embodiments, the interference surface can be recessed with respect to adjacent portions of the head. In some embodiments, the interference surface on the outside surface of the head can be advantageous for a smaller diameter diaphragm assembly which can be used, for example, with low flow rates.

Figure 12B:
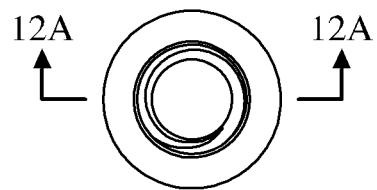
FIGS. 12A-B illustrate an embodiment of an insert according to the disclosure.
Figure 12A:
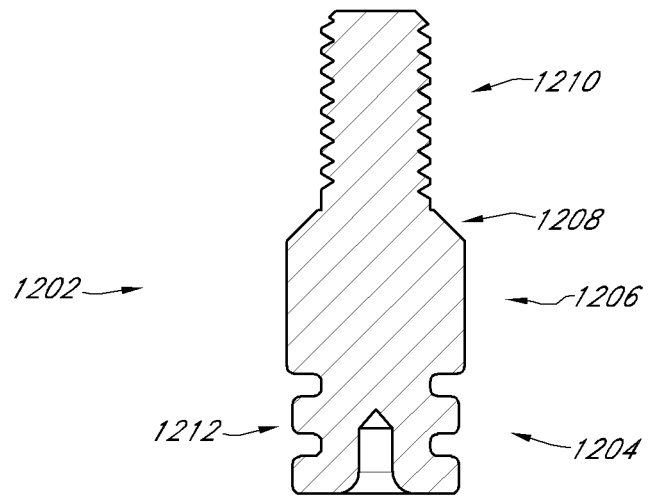

FIGS. 12A-B illustrates an embodiment of an insert 1202 having a head portion 1204, a body portion 1206, a narrowing portion 1208, and a threaded portion 1210. The head portion 1204 can be generally circular in shape, though the shape does not limit the disclosure.

In some embodiments, the head portion 1204 can be wider than the other portions. For example, in some embodiments the head portion 1204 is approximately 0.1, 0.2, 0.3, 0.4, 0.5, 0.6, 0.62, 0.7, 0.8, 0.9, 1.0, 1.1, 1.149, 1.2, 1.3, 1.4, or 1.5 inches in diameter. In some embodiments, the diameter of the head portion 1204 as compared to the diameter of a polymer diaphragm, can be approximately 1:1, 1:1.5, 1:2, 1:3, 1:3.45, 1:4, 1:5, 1:6, 1:7, 1:8, 1:9, or 1:10. In some embodiments, the head portion 1204 has a thickness of approximately 0.05, 0.1, 0.120, 0.2, 0.3, 0.4, or 0.5 inches. The head portion 1204 can extend about 0.1, 0.2, 0.270, 0.3, 0.35, 0.4, 0.5, or 0.6 inches away from the body portion 1206. However, the size of the head portion 1204 is not limiting.

Further, the head portion 1204 can have a grooved interference surface 1212 on its outer surface. This grooved interference surface 1212 can be used, for example, with or without a tapped hole. The grooved interference surface 1212 can be, for example, a boss protruding out of the body portion 1206 of the insert 1202. This grooving can provide for a further mechanical bond between the insert 1202 and a polymer diaphragm that can be located around the insert 1202. The polymer diaphragm can be injection molded so that the polymer extends into the grooved interference surface 1212. The grooving can extend fully or partially around the circumference of the insert 1202. In some embodiments, one grooved interference surface 1212 can be used on the head portion 1204. In some embodiments, a plurality of grooved interference surfaces 1212 can be used. The grooved interference surface 1212 can have a groove depth of 0.1, 0.2, 0.3, 0.4, 0.460, 0.5, 0.6, or 0.7 inches. The grooved interference surface 1212 can have grooves having a thickness of 0.03, 0.04, 0.05, 0.06, 0.062, 0.07, 0.08, or 0.09 inches.

The body portion 1206 can follow the head portion 1204. The body portion 1206 can be generally cylindrical in shape. In some embodiments, the body portion 1206 can have a diameter of approximately 0.1, 0.2, 0.3, 0.4, 0.492, 0.5, 0.6, 0.7, or 0.8 inches. The distance from the far end of the head portion 1204 to the opposite end of the body portion 1206 can be approximately 0.1, 0.2, 0.3, 0.4, 0.480, 0.5, 0.6, or 0.7 inches. In some embodiments, following the body portion 1206 can be the narrowing portion 1208. The narrowing portion 1208 can reduce the overall diameter of the insert 1202. In some embodiments, the narrowing portion 1208 has a generally smooth shape, and in some embodiments the narrowing portion 1208 has a step wise shape. The distance from the far end of the head portion 1204 to the opposite end of the narrowing portion 1208 can be approximately 0.1, 0.2, 0.3, 0.4, 0.5, 0.565, 0.6, 0.7, 0.8, 0.9, or 1.0 inches. In some embodiments, the total length of the insert 1202 can be approximately 0.5, 0.7, 0.9, 0.965, 1.0, 1.5, or 2 inches. The total length of the insert 1202 does not limit the disclosure. In some embodiments, the insert 1202 may not have a narrowing portion 1208, and the body portion 1402 can flow directly into the threaded portion 1210.

In some embodiments, the portion following the narrowing portion 1208 can be the threaded portion 1210. In some embodiments, the threaded portion 1210 can be an interference surface. The threaded portion 1210 can have a diameter less than both the head portion 1204 and the body portion 1206. The threaded portion can be configured to mate with a pump, such as the pump used in the prior art shown as FIG. 3. However, the attachment of the insert 1202 to a pump does not limit the disclosure, and any type of attachment means can be used. FIG. 12B illustrates a top down viewpoint of the insert 1202.

Figure 13B:
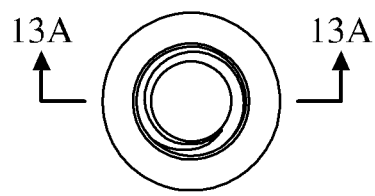
FIGS. 13A-B illustrate an embodiment of an insert according to the disclosure.
Figure 13A:
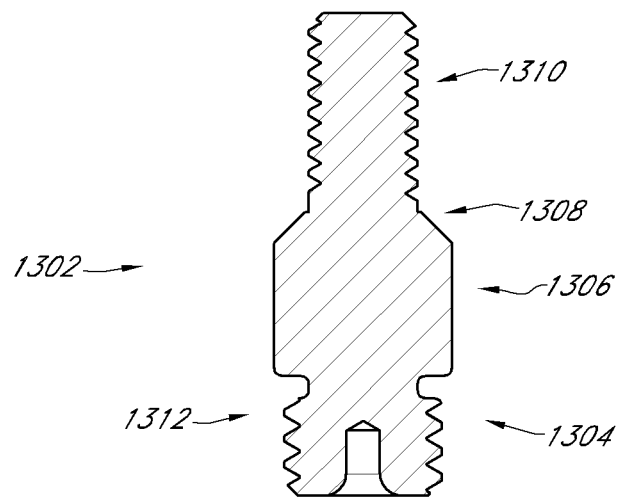

FIGS. 13A-B illustrate an embodiment of an insert 1302 having a threaded interference surface 1312. As shown in FIG. 13A, the head portion 1304 can have a threaded interference surface 1312 on its outer surface that is a thread. This threaded interference surface 1312 can be used, for example, with our without a tapped hole. The threaded interference surface 1312 can be, for example, a boss protruding out of the insert 1302 and having a threaded surface. This threading can provide for a mechanical bond between the insert 1302 and a polymer diaphragm that is located on top. In some embodiments, the threaded interference surface 1312 can extend the whole length of the head portion 1304. In some embodiments, the threaded interference surface 1312 only extends partially down the length of the head portion 1304. In some embodiments, one threaded interference surface 1312 can be found on the head portion 1304. In some embodiments, a plurality of threaded interference surfaces 1312 can be used. Similar to the above FIGS. 12A-B, the insert 1302 can have a body portion 1306, a narrowed portion 1308, and a threaded portion 1310.

The threaded interference surface 1312 can have a thread depth of 0.1, 0.2, 0.3, 0.4, 0.436, 0.5, 0.6, or 0.7 inches. The threaded interference surface 1312 can have a ¼, ⁵⁄₁₆, ⅜, ⁷⁄₁₆, ½, ⁹⁄₁₆, ⅝, ¾, or ⅞ thread, but the size of the thread is not limiting. FIG. 13B illustrates a top down viewpoint of the insert 1302 having threaded interference surface 1312.

Figure 14B:
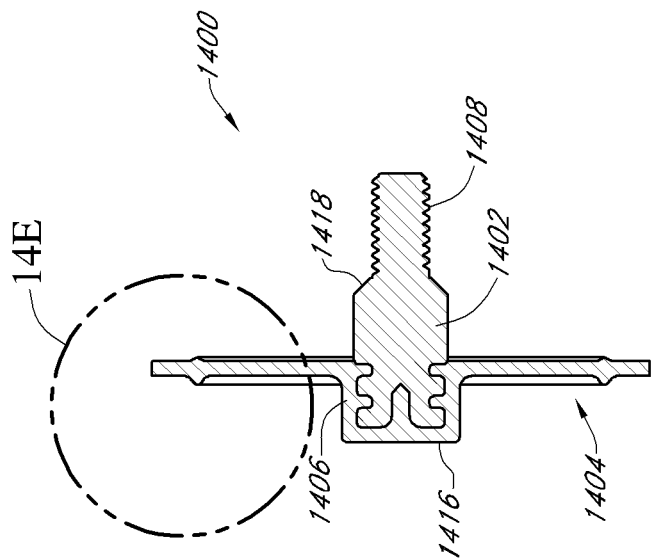
FIGS. 14A-E illustrate an embodiment of a diaphragm according to the disclosure.
Figure 14A:
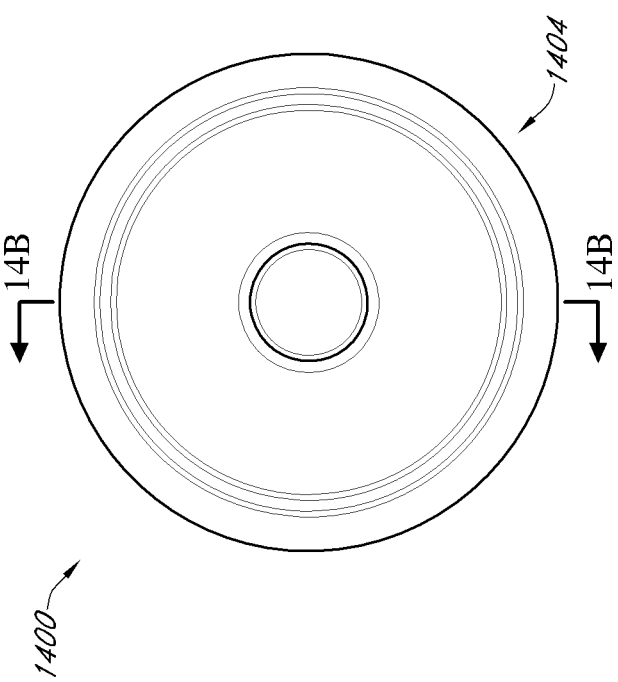
Figures 14C, 14D, 14E:
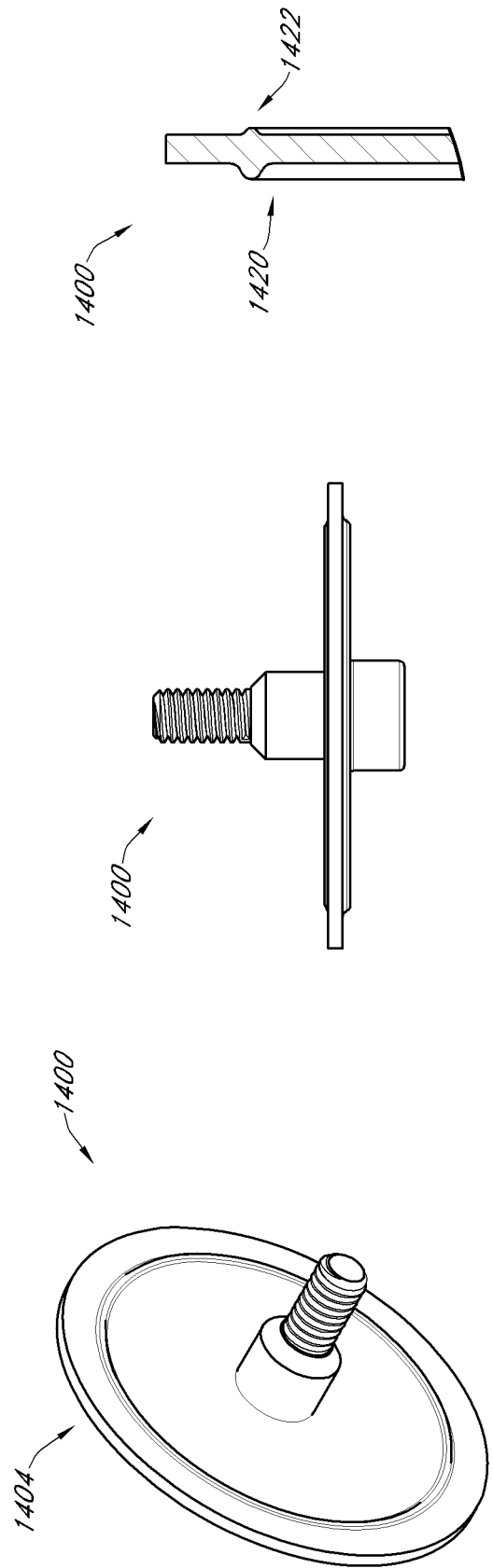
Figure 15:
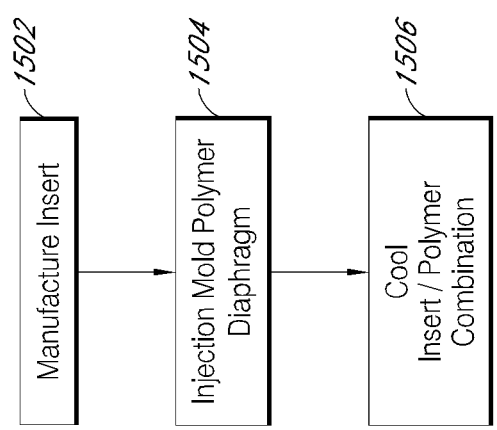
FIG. 15 illustrates a method for manufacturing embodiments of a diaphragm according to the disclosure.

FIGS. 14A-E illustrate an embodiment of a diaphragm assembly according to the present disclosure. FIG. 14A shows a side cross section of a diaphragm assembly 1400. As shown, the diaphragm assembly 1400 can be formed from a two part system, though other parts can be used as well and the number of parts does not limit the disclosure. In some embodiments, there is can be an insert 1402 surrounded by a polymer diaphragm 1404. The insert 1402 can contain an outer interference surface 1406, such as those described with respect to FIGS. 12 and 13. FIGS. 14B-C illustrate different viewpoints of an embodiment of a diaphragm assembly 1400. FIG. 14D illustrates a side view of the diaphragm assembly 1400 without a cut out.

FIG. 14E illustrates a side viewpoint of an embodiment of a polymer diaphragm 1404. In some embodiments, the polymer diaphragm 1404 can have at least one ring 1420 located on a surface of the diaphragm 1404. In some embodiments, the polymer diaphragm 1404 can have a second ring 1422 located on a surface of the diaphragm 1404 opposite ring 1420. In some embodiments, rings 1420/1422 are directly opposite one another. In some embodiments, rings 1420/1422 are not directly opposite one another. In some embodiments, the rings 1420/1422 can have a radius of 0.005, 0.01, 0.02, 0.03, 0.04, or 0.05 inches. In some embodiments, the rings 1420/1422 can be the same size. In some embodiments, one ring can be larger than the other ring.

In some embodiments, the insert 1402 and polymer diaphragm 1404 can be approximately 0.5, 1.0, 1.415, or 1.5 inches in length. The threaded portion 1408 can be at least approximately 0.1, 0.2, 0.3, 0.40, 0.5, 0.550 or 0.6 inches in length, and the rest of the insert 1402 and polymer diaphragm 1404 can be approximately 0.1, 0.2, 0.3, 0.4, 0.5, 0.6, 0.645, 0.7, 0.8, 0.9, or 1 inches in length. In some embodiments, the insert 1402 can have a narrowing portion 1418 between the threaded portion 1408 and a head portion 1416. The length of the polymer diaphragm 1404 to the beginning of the narrowing portion 1418 can be approximately 0.1, 0.2, 0.3, 0.4, 0.5, 0.560, 0.6, or 0.7 inches. None of the above dimensions limit the disclosure. The diameter of the polymer on top of the interference surface 1406 can be about 0.3, 0.4, 0.5, 0.6, 0.62, 0.7, 0.8, or 0.9 inches. The diameter of the polymer diaphragm 1404 can be about 1.5, 1.8, 2.0, 2.1, 2.140, 2.3, or 2.5 inches.

As would be understood by a person skilled in the above from the above description, the interference surfaces described herein can be formed having either axial (such as shown in FIGS. 6-11) or radial (such as shown in FIGS. 12-14) depth, or both, and the direction of the interference surface does not limit the disclosure.

Polymer Diaphragm

In some embodiments, the diaphragms described above can be made of a polymer, or a combination of polymers. For example, the diaphragm can be made of polyvinylidene fluoride (PVDF). PVDF is a highly non-reactive thermoplastic fluoropolymer which is polymerized with vinylidene difluoride. PVDF is strong and extremely resistant to solvents, acids, bases, and heat. Further, PVDF has a relatively low melting point of approximately 177° C., so it can be easier to melt than other polymers. PVDF has a glass transition temperature of about −35° C., and can be from around 50-60% crystalline. In some embodiments, PVDF can be mechanically stressed to orient its molecular chains.

In some embodiments, the polymer used, such as PVDF, can be transparent or semi-transparent. By having a transparent or semi-transparent polymer, a user could visually check to see if delamination is occurring between the insert and the polymer. Additionally, a user could visually check whether particles were being formed through, for example, abrasion. This could allow a user to determine when to replace a diaphragm. However, non-transparent polymers could also be used, and the opacity of the polymer does not limit the disclosure unless otherwise stated.

In some embodiments, specific PVDF compositions can be used. For example, KYNAR ULTRAFLEX® B (ULTRAFLEX) can be used alone, or in conjunction with natural PVDF, to form a diaphragm. Natural PVDF can be, for example, KYNAR PVDF 700 SERIES. ULTRAFLEX is a semi-crystalline copolymer of vinylidene fluoride and a hexafluoropropylene. It is a highly flexible material, and has high toughness and weatherability. Further, ULTRAFLEX is extremely chemically resistant, and can be used in different corrosive environments.

In some embodiments, 0.1%, 0.2%, 0.3%, 0.4%, 0.5%, 0.6%, 0.7%, 0.8%, or 0.9% by weight natural PVDF can be mixed with ULTRAFLEX. In some embodiments, greater than 0.1%, greater than 0.5%, or greater than 1.0%, by weight, of natural PVDF can be mixed with ULTRAFLEX. In some embodiments, less than 1.0%, or less than 2.0% by weight of natural PVDF can be added.

In some embodiments, 1%, 2%, 3%, 4%, 5%, 6%, 7%, 8%, or 9% by weight natural PVDF can be mixed with ULTRAFLEX. In some embodiments, greater than 1%, greater than 5%, or greater than 10.0%, by weight, of natural PVDF can be mixed with ULTRAFLEX. In some embodiments, less than 10.0%, or less than 20.0% by weight of natural PVDF can be added.

The addition of ULTRAFLEX can change the overall properties of the polymer. For example, without the natural PVDF, ULTRAFLEX can harden too quickly, forming waves in the finished product. Adding the natural PVDF can increase the flow rate of the material while injection molding, and can smooth the overall shape of a final manufactured piece. By increasing the flow rate, more control can be maintained over the flow of the polymer during injection molding.

Moreover, ULTRAFLEX is a relatively flexible material, but is not as hard as may be needed. On the other hand, PVDF has relatively high Shore hardness. Therefore, the addition of natural PVDF to ULTRAFLEX can increase the overall hardness of the ULTRAFLEX, which can also make the ULTRAFLEX it tougher. For example, without the use of natural PVDF, ULTRAFLEX by itself heavily abrades when used with rollers. However, too much natural PVDF may cause the ULTRAFLEX to lose its flexibility, making the diaphragm more rigid, which can lead to faster breakage during repeated stress cycles.

The incorporation of natural PVDF into ULTRAFLEX can allow for the diaphragm to be used in pressure systems that have 50% or more pressure than ULTRAFLEX alone. For example, a diaphragm made of the combination may be used in pressures of 150 psi or greater, whereas previous diaphragms, such as those disclosed above, have a max pressure of 100 psi.

The addition of lower percentages of natural PVDF will not significantly affect the opacity of the finished diaphragm, thereby allowing a user to continue to be able to see through. Further, the chemical resistance properties of ULTRAFLEX are maintained, as the addition of natural PVDF will also not affect these properties.

In some embodiments, the entire diaphragm assembly can be made from PVDF, such as those described above. In some embodiments, other polymers, such as polypropylene or polyvinyl chloride can be used. In some embodiments, PTFE is not used in the diaphragm.

The above described polymers do not limit the disclosure, and other polymers that can be injection molded can also be used. Different polymers can be chosen based on their resistance to specific chemical environments in when the diaphragm system may be used in. For example, a polymer resistant to chlorine or fluorine may be used in conjunction with water treatment facilities.

Manufacturing of Diaphragm Assembly According to Embodiments of the Disclosure

In some embodiments, a diaphragm assembly can be manufactured at least partially through the use of injection molding. Injection molding has not been performed for diaphragm assemblies, such as the prior art, because of substantial difficulties, as further described below. Embodiments of the diaphragm assembly described above have substantially reduced the difficulties in forming a diaphragm assembly through injection molding.

Typically, diaphragms made in the prior art use compression molding to form any polymers. However, compression molding can have serious drawbacks, such as poor product consistency and difficulty in controlling flashing. Further, compression molding may not be suitable for certain types of parts, such as inserts with large heads.

In some embodiments, an insert with at least one hole can be manufactured 1502, such as inserts described above. Once the insert is manufactured, the insert can be situated so that a polymer can be injection molded around the insert. For example, the insert can be placed inside a cavity where molten polymer can flow around the insert, covering it such as embodiments of the above disclosure. Once the insert is properly located, a polymer diaphragm can be injection molded around the insert 1504. A screw or ram plunger can be used to force molten polymer material into a cavity surrounding the insert. The polymer diaphragm can fully encompass a portion of the insert, and can flow into any holes in the insert. The use of at least one hole during injection molding can give better adhesion between the diaphragm and the insert. Further, the use of at least one hole can allow for a larger insert to be used, due to the greater adhesion between the diaphragm and the insert.

In some embodiments, the cavity can then be cooled 1506 to a temperature where the polymer is solidified around the insert. This can be done by, for example, water cooling, ice cooling, or air cooling, and the method of cooling does not limit the disclosure. In some embodiments, the act of injecting the polymer into the cavity can adequately cool the polymer, and no further step need be taken, and step 1506 can be optional.

Figure 16C:
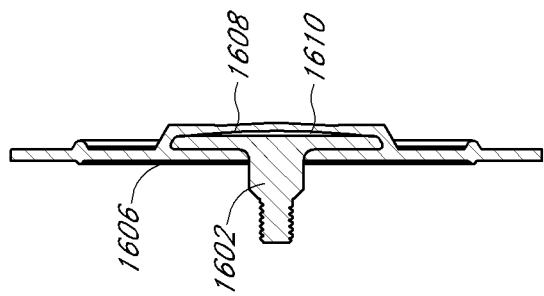
FIG. 16A-C illustrate manufacturing limitations of the above disclosed prior art.
Figure 16B:
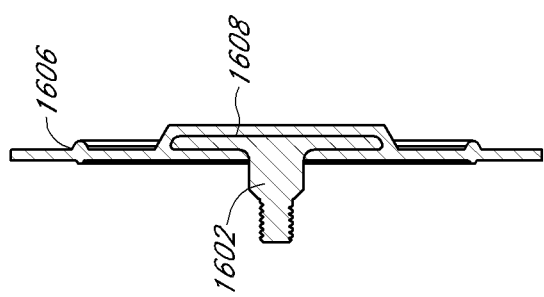
Figure 16A:
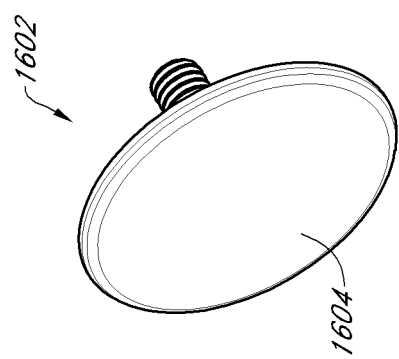

As mentioned above, the use of a tapped hole and/or bonding holes can increase the overall adhesion of the polymer diaphragm to the insert. As shown in FIGS. 16A-C, the diaphragms described in the above prior art have additional significant problems. FIG. 16A illustrates a insert 1602 with a smooth or textured, such as sandblasted, surface 1604, such as those described in the prior art. There are no holes, such as tapped or bonding holes, in the insert, unlike those described above. FIG. 16B illustrates the initial diaphragm assembly with the insert 1602 and the polymer diaphragm 1606. The insert 1602 and the polymer diaphragm 1606 meet at a surface 1608. When the polymer is injection molded, the polymer will not adhere to the surface of the insert 1602. If an injection molding was used, a gap 1610, as shown in FIG. 16C would form on the surface 1608 between the insert 1602 and the polymer diaphragm 1606. This would lead to pumping inefficiencies, as well as eventual diaphragm failure. In addition, a gap 1610 could result in a rubbing motion between the diaphragm 1606 and the insert 1602. Rubbing can lead to abrasion and the formation of particulates, which could negatively affect the diaphragm assembly. Accordingly, injection molding has not been used for diaphragm assemblies of the prior art, and the above disclosure shows the advantageous use of injection molding with the disclosed diaphragm assemblies.

From the foregoing description, it will be appreciated that an inventive carbide alloy and method of manufacturing are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A diaphragm assembly comprising:
    a one piece metal insert having a head portion, a body portion, a narrowing portion and a threaded portion, wherein the head portion is located at a first end of the body portion, the narrowing portion is located at a second end of the body portion and the threaded portion is located at an end of the narrowing portion opposite the body portion;
    wherein the body portion is cylindrical and an outermost cylindrical surface of the body portion extends radially outward at least as far as an outermost cylindrical surface of the head portion, and wherein the head portion of the insert defines at least a first outer groove and a second outer groove; and
    an injection-molded polymer diaphragm configured to at least partially surround the head portion of the insert and extend into the first outer groove and the second outer groove.

2. The assembly of claim 1, wherein the head portion of the insert further comprises a tapped hole.

3. The assembly of claim 1, wherein the polymer comprises natural PVDF.

* * * * *